Aug. 8, 1939.     W. O. GEYER ET AL     2,169,194
CHEMICAL APPARATUS
Filed March 20, 1937
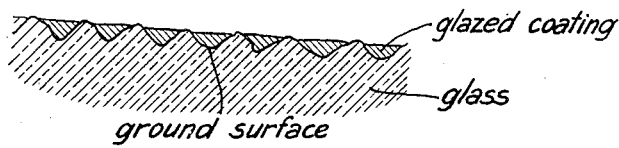
Fig. 1.
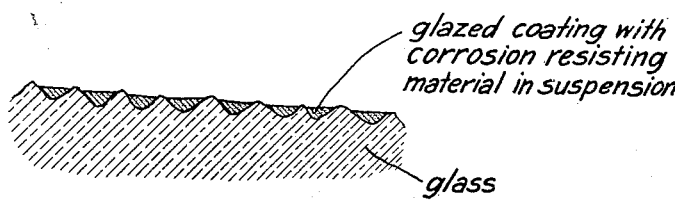
Fig. 2.
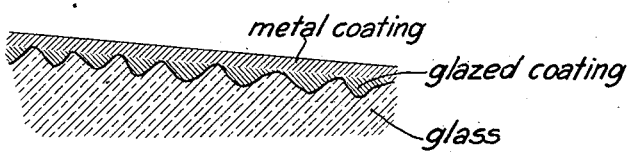
Fig. 3.
Fig. 4.
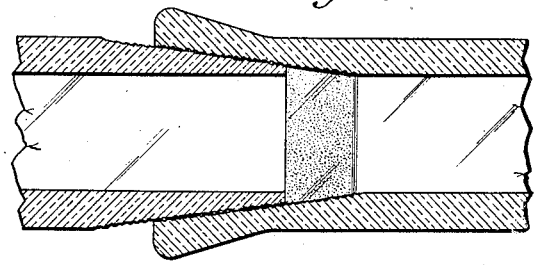
Fig. 5.
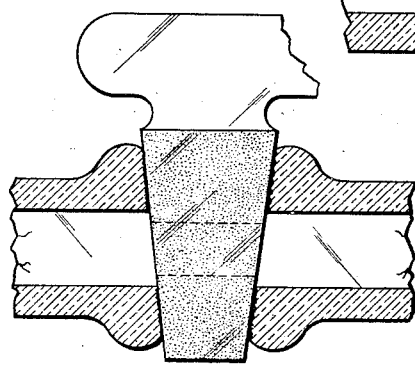
INVENTORS
WILLIAM O. GEYER
CHARLES A. WELLER.
BY
ATTORNEY Patented Aug. 8, 1939

2,169,194

UNITED STATES PATENT OFFICE 2,169,194

CHEMICAL APPARATUS

William O. Geyer and Charles A. Weller, Bloomfield, N. J.; said Weller assignor to said Geyer Application March 20, 1937, Serial No. 132,045

4 Claims. (Cl. 285—161)

This invention relates to ground glass joints, and more particularly to ground glass joints having complementary shaped male and femall surfaces adapted to seat one within the other in substantial fluid and gas tight relation, such as stopcocks, cylinder and piston combinations, tubular joints, stopper closed openings and the like, heretofore utilized in chemical and physical apparatus.

One of the objects of the present invention is to provide an improved male and female ground glass joint. Another object of this invention is to provide such a joint wherein the respective male and female parts are adapted to be seated one within the other in fluid and gas tight relation at normal, reduced or higher pressures without the use of lubricating materials upon the engaging male and female surfaces. Another object is to provide a corrosion resisting surface for the engaging male and female parts. Still another object is to provide a method for treating the ground engaging surfaces of such joints whereby the said surfaces are rendered substantially resistant to corrosion and whereby the use of lubricant upon the said surfaces may be dispensed with in the engaging and dis-engaging of the male and female parts thereof. Other objects and advantages will become apparent as the invention is more fully disclosed.

We have found that when two glass surfaces are ground to present complementary shaped engaging surfaces, the ground surface of each may be made rotatable relative to each other by the application thereto of a suitable glaze. The glaze composition applied to the ground surface must have a softening point at a temperature below that of the glass to which it is applied, and the two opposing surfaces should be glazed with substantially the same glaze composition so as to present opposing and engaging surfaces of substantially the same degree of hardness.

The glaze should preferably just about cover the highest point on the ground surface, filling in the interstices of the ground surface and leveling off substantially at the high point of the ground surface. The difficulty of obtaining a glaze surface lying substantially parallel to the ground surface with any great uniformity of thickness of material superposed on the ground surface, is great and we therefore prefer to limit the thickness of the glaze to the minimum necessary to substantially cover the high points on the ground surface, the object being to preserve as nearly as possible the original close fit between the opposing ground surfaces after the application of the glaze thereto.

Thus glazed, we have found the opposing male and female surfaces to be freely rotatable relatively to each other to seat the same together and we have found that by thus filling up the grinding interstices we obtain a seated union between the surfaces which is substantially perfect as compared to the unglazed ground joint with lubricating materials therebetween. Such a joint is substantially vacuum tight and substantially free from seepage of gases and liquids therethrough. We have found, moreover, that by careful polishing of the glazed surfaces with rouge and the like powders, the seal seating therebetween may be improved, if not initially all that was desired.

For many purposes, it is desirable to render the seating surfaces substantially corrosive resistant towards the particular medium (gaseous or liquid) which is present in the apparatus. We have found two ways of accomplishing this.

The first way is to incorporate within the glaze a proportion of a material which is adapted to impart to the glaze the desired resistance to corrosion. This incorporated material may be metallic or non-metallic. We have found, for example, that many metallic powders, metallic oxides, silicates, borates, phosphates, and the like compounds, may be added to the glaze composition and may by reason of solution in the glaze, miscibility with the glaze, or suspension therein, impart to the glaze composition added resistance to corrosion towards certain or all gaseous and liquid reagents.

The second way found effective for this purpose is to surface the glaze with a metal which evidences a corrosion resistance towards the particular medium, gaseous or fluid, traversing the joint. Preferably this metal surface is comprised of a ductile metal having a thickness substantially sufficient to form a bearing seat on the said glazed surface. Still more preferably the coating should be comprised of a ductile noble metal, specifically, silver, gold, platinum or palladium.

In the forming of this metal coating we prefer to employ thermally decomposable organic compounds of the noble metals and apply the same thereto in a succession of relatively thin coatings. In the forming of coatings of those ductile metals which do not form thermally decomposable organic compounds, we first form a relatively thin coating of a ductile noble metal by thermally decomposing an organic compound and then electrolytically deposit the said ductile metal thereon to the thickness desired. Subsequently the electrolytically deposited coating may be annealed to insure proper bonding of the same to the under coat of ductile noble metal if desired. In this manner coatings of the less noble metals such as copper, chromium, tin, zinc and the like may be provided upon the glazed over ground glass surfaces. Alternatively the coating may be electrically sputtered or sprayed thereon with or without the undercoat of ductile noble metal, if desired.

As hereinabove described, it is preferable to first glaze the ground glass surface of the joint and for this purpose we utilize a low melting "frit" preferably comprised substantially of lead oxide and silica, but which alternatively may be comprised wholly or in part of other low melting glaze compositions. The proportions of lead oxide and silica, for example, may be varied widely without departure from the present invention, depending upon the melting point particularly desired in the "frit". The lowest melting mixture is that wherein the two constituents are present in approximately equal molecular proportions in accordance with the formulas $PbO \cdot SiO_2$. This has a softening point at about 480° C. When silica is present in molecular proportions two and three times this amount the softening point of the "frit" approximates 570° C. and 620° C., respectively. There is a wide range of lead silicate melting point frit compositions therefor available in the practice of this invention.

The practice of this invention is of most practical utility with relatively high melting glasses such as that known in the art as Pyrex, for the reason that this glass is the most commonly employed for chemical and physical apparatus due to the fact that it evidences greater resistance to corrosion towards gases and liquids commonly utilized in such apparatus and to breakage incident to temperature differentials. This glass composition has a softening temperature of about 650° C. and may be safely heated as high as 600° C. without warping from previously fixed dimensions. Accordingly, with parts comprised of this glass composition we may safely employ a frit composition having a melting or softening point as high as 590° C.

The lead silicate composition of this preferred frit heretofore in the art has been considered less corrosion resistant towards acids, alkalis and other reagents than other glass compositions. However we have found that lead silicates are of relatively high resistance to corrosion particularly towards alkali solutions and particularly when the lead oxide and silica are in approximately equal molecular proportions. Irrespective of this we have found it highly advantageous to incorporate therein a proportion of a material, such as a silicate or oxide which in solution or suspension in the glaze composition will impart added corrosion resistance to the glaze towards a particular acid or alkali or generally towards all such corroding mediums. For example, relatively small amounts of zirconium and titanium silicates markedly increase the resistance to corrosion of the lead silicate towards acid and alkali solutions. Additions of metal oxides such as chromium oxide, tantalum oxide, tin oxide, zirconium oxide, titanium oxide and zinc oxide behave similarly.

Some of the most troublesome of all corroding mediums in ground glass joints are the alkali solutions, such as caustic soda, caustic potash, sodium or potassium carbonate solutions. The glazing of the ground surface in accordance with the present invention markedly improves the resistance of the surface to these corroding media by reducing the area of contact corrosion available to attack. It is highly advantageous to incorporate in the lead silicate glaze composition a proportion of zirconium or titanium oxide or silicate to thereby increase the resistance of the glaze to these particular mediums. For example, titanium silicate in amounts up to about 6%; zirconium silicate in amounts up to 3% have been found useful for this purpose. It is preferable that the amount of such materials that are added to increase the corrosion resistance of the glaze, should not exceed that which is miscible in the glaze composition at the melting point desired in the glaze, as the maximum benefits are obtained through the use of a homogeneous glaze composition. However, we are not necessarily limited to a homogeneous miscible glaze composition, as we may for example prepare a glaze composition having the desired melting point by pre-melting, then cool the same, grind to an exceedingly fine powder, incorporate therein a proportion of an insoluble metallic or non-metallic material having the desired corrosion resistance, and utilize this mixture as a glazing composition, the original glaze then serving as a carrier for the added corrosion resistant material. Thus for example, in a lead silicate glaze composition of desired meting point, we may incorporate gold, silver, chromium, tantalum, zinc, tin, copper and the like as metal powders or a thermally decomposable organic compounds, or alternatively we may incorporate various metal compounds such as silicates, oxides, phosphates, bronzes and the like, in such proportion as to produce a desired corrosion resistant glaze composition.

Having formed the glazed surface on and overlying the ground surface, the said glaze being closely bonded to the ground surface thereof, it is apparent that such a glaze surface has marked strength and adherence to the ground surface. As hereinabove noted, where two surfaces have been properly ground for hermetic seating in the presence of a lubricant, the provision of the glaze surface thereon eliminates the necessity of such a lubricant.

By incorporating into the glaze composition one of the corrosion resistant materials as hereinabove described the basic lead silicate composition is made more resistant to corrosion towards particular mediums or towards a particular class of mediums, fluid and gaseous. A still further advantage, particularly towards vacuum tight sealing between the seated surfaces, and towards the seepage of gases and of liquids of relatively low specific gravity such as alcohol, chloroform, ether and the like, as well as added protection from contamination of gases and liquids by corrosion of the contacting surfaces, may be obtained by surfacing the glaze with a ductile metal, preferably a ductile noble metal, such as silver, gold, platinum or palladium, to such a thickness as will provide opposing bearing seats on said surface.

This we do by painting the glazed surface with a solution containing a thermally decomposable organic salt of a noble metal, using in the solution a proportion of a fluxing compound which will roughen the surface of the glaze sufficiently for the metal to adhere thereto upon thermal decomposition of the metal salt. A succession of such coatings may be applied, thereby building up a sufficient thickness of the metal to provide a satisfactory bearing seat on said surface. Alternatively, after the first coat of ductile noble metal has been thus applied, succeeding coats of other metals such as copper, chromium or nickel may be electrolytically deposited to the depth desired, or electrically sputtered or sprayed thereon. The said electro-plated sprayed or sputtered metal may then be annealed to cause the same to adhere to or diffuse into the noble metal undercoat, as hereinabove described.

As a specific embodiment of the practice of the present invention, but not as a limitation thereof, I will first described the method I have devised for providing a ground glass surface with a suitable glazed surface.

The particular low melting glaze composition preferably the mono-silicate compound of lead oxide and silica is first formed and pre-melted to insure substantially uniform composition. The melt is cooled and finely pulverized to a particle size adapted to permit the same to be retained within the grinding interstices of the ground surface. This finely ground glaze then is mixed with vaseline or similar carrier to a heavy cream and small proportion of the cream is applied to the ground glass surface and rubbed thoroughly into the interstices therein. The excess of the cream is carefully wiped off from the ground surface and the thus coated surface is subjected to substantially uniform heating in an oxidizing atmosphere to a temperature adapted to soften the glaze particles and thereby form the desired glaze over the ground surface.

Where added corrosion resistance is desired in the lead silicate glaze composition, we prefer to use titanium silicate which is miscible with the lead silicate in amounts up to about 6%. The titanium silicate should be added to the lead oxide and silica and fused therewith in the forming of the "frit".

Where metal powders are to be incorporated into the frit composition for added corrosion resistance, the powders are mixed with the finely ground frit prior to the forming of the cream, and the atmosphere within which the frit is subsequently heated should be preferably inert towards such metal powders. Where thermally decomposable organic compounds of the noble metals are to be incorporated within the frit the solution of the organic compound may be used in part or in whole as a carrier in the forming of the cream and the atmosphere should be oxidizing to insure the removal of carbon from the glaze.

In the drawing, Figs. 1 to 3 inclusive schematically illustrate the various coated ground glass surface products obtainable by the practice of the present invention, appropriately identified by suitable legends, and Figs. 4 and 5 illustrate specific embodiments of the present invention.

Fig. 1 illustrates schematically the basic product of the present invention namely a glazed ground glass surface.

Fig. 2 illustrates one modification of the product of Fig. 1, namely, a corrrosion resistant glazed ground glass surface with the corrosion resistant component of the glaze in suspension in the glaze.

Fig. 3 illustrates a third modification of the present invention, namely a glazed ground glass surface provided with a coating of a ductile metal, having a thickness adapted to provide the surface with a bearing seat.

In the drawing in Fig. 4 we have also illustrated as one specific embodiment of the practice of this invention a tubular male and female joint comprised of glass which is improved in accordance with the practice of the present invention by the application to the ground and seated engaging surfaces of the male and female parts thereof, any one of the said modifications illustrated in Figs. 1 to 3 inclusive. Fig. 5 illustrates as a second specific embodiment a stop-cock having the tapered engaging surface of the plug and barrel similarly covered by any one of the modifications illustrated in Figs. 1 to 3 inclusive. The engaging surface of other male and female combinations may be coated without departure from the present invention, and by the use of the term "male and female joint" as it may hereinafter appear in the claims, these products also are to be construed as having been included.

Having broadly and specifically disclosed the present invention and given several specific embodiments thereof, it is apparent that the same may be widely varied and modified without departure therefrom and all such modifications and changes are contemplated as may fall within the scope of the following claims.

What is claimed is:

1. In a glass joint consisting of male and female parts having complementary shaped annular surfaces ground to seat together, a surfacing layer of a glaze composition sintered and fused onto and into each said ground surface, said glaze composition having a melting point substantially below the softening point of the glass composition comprising said parts.

2. In a glass joint consisting of male and female parts having complementary shaped annular surfaces ground to seat together, a surfacing layer of a glaze composition sintered and fused onto and into each said ground surface, said glaze composition having a melting point substantially below the softening point of the glass composition comprising said parts and having a composition substantially resistant to corrosion by gases and liquids passing through said joint.

3. In a glass joint consisting of male and female parts having complementary shaped annular surfaces ground to seat together, a surfacing layer of a glaze composition sintered and fused onto and into each said ground surface, said glaze composition having a melting point substantially below the softening point of the glass composition comprising said parts and having a proportion of finely divided metal powder dispersed throughout said glaze composition.

4. In a glass joint consisting of male and female parts having complementary shaped annular surfaces ground to seat together, a surfacing layer of a glaze composition sintered and fused onto and into each said ground surface, said glaze composition having a melting point substantially below the softening point of the glass composition comprising said parts and a layer of ductile metal superposed on each said glaze surface the thickness of each said layer being adapted to provide a bearing seat for the engaging male and female parts.

WILLIAM O. GEYER.
CHARLES A. WELLER.